US012598601B2

(12) United States Patent
Bansal et al.

(10) Patent No.: US 12,598,601 B2
(45) Date of Patent: Apr. 7, 2026

(54) RADIO FREQUENCY SHARED PATH INFORMATION

(71) Applicant: QUALCOMM Incorporated, San Diego, CA (US)

(72) Inventors: Hargovind Prasad Bansal, Hyderabad (IN); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/012,854

(22) PCT Filed: Aug. 19, 2021

(86) PCT No.: PCT/US2021/046737
§ 371 (c)(1),
(2) Date: Dec. 23, 2022

(87) PCT Pub. No.: WO2022/046518
PCT Pub. Date: Mar. 3, 2022

(65) Prior Publication Data
US 2023/0300820 A1      Sep. 21, 2023

(30) Foreign Application Priority Data

Aug. 27, 2020    (IN) ............................. 20204103693.5

(51) Int. Cl.
*H04W 72/12* (2023.01)
*H04L 5/00* (2006.01)
(Continued)

(52) U.S. Cl.
CPC ....... *H04W 72/1215* (2013.01); *H04L 5/0051* (2013.01); *H04W 72/21* (2023.01); *H04W 88/06* (2013.01)

(58) Field of Classification Search
None
See application file for complete search history.

(56) References Cited

U.S. PATENT DOCUMENTS 11,844,091 B2 * 12/2023 Chakraborty ......... H04W 72/23
2016/0219648 A1 * 7/2016 Awoniyi-Oteri ........ H04W 8/24
(Continued)

FOREIGN PATENT DOCUMENTS

EP          3416452 A1    12/2018
WO       2020164036 A1    8/2020

OTHER PUBLICATIONS

Qualcomm, "UE Capability for enhanced NR mobility", Aug. 19, 2019, 3GPP TSG-RAN WG2 Meeting #107, R2-1910895, pp. 1-3.*
(Continued)

*Primary Examiner* — Steve R Young
(74) *Attorney, Agent, or Firm* — Procopio, Cory, Hargreaves & Savitch

(57)          ABSTRACT
A user equipment (UE) that shares a radio frequency (RF) path between wireless communication for a first radio access technology (RAT) on a first frequency band and a second RAT on a second frequency band transmits an indication, to a network of the first RAT or the second RAT, indicating a shared RF path between the first RAT and the second RAT. A base station receives the indication from the UE and wireless communication with the UE based on the shared RF path at the UE.

30 Claims, 11 Drawing Sheets

400

_____ Control plane signaling

_._._._._._ User plane data

(51) Int. Cl.
   *H04W 72/21*     (2023.01)
   *H04W 88/06*     (2009.01)

(56)        References Cited

U.S. PATENT DOCUMENTS

| | | | |
|---|---|---|---|
| 2018/0198556 A1* | 7/2018 | Yerramalli | H04W 74/0808 |
| 2018/0368199 A1* | 12/2018 | Zeng | H04W 88/10 |
| 2019/0052328 A1* | 2/2019 | Akula | H04B 7/061 |
| 2019/0215783 A1* | 7/2019 | Chakraborty | H04W 52/146 |
| 2019/0253214 A1* | 8/2019 | Liu | H04B 7/0413 |
| 2020/0068409 A1* | 2/2020 | Shin | H04W 72/0453 |
| 2020/0314748 A1* | 10/2020 | Kim | H04W 74/006 |
| 2020/0344832 A1* | 10/2020 | Hu | H04W 72/0453 |
| 2022/0353042 A1* | 11/2022 | Gao | H04B 7/0602 |

OTHER PUBLICATIONS

International Search Report and Written Opinion—PCT/US2021/046737—ISA/EPO—Dec. 3, 2021.

Qualcomm Incorporated: "UE Capability for Enhanced NR Mobility", 3GPP Draft, 3GPP TSG-RAN WG2Meeting #107, R2-1910895, UE Capability for Enhanced NR Mobility, 3rd Generation Partnership Project (3GPP), Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 16, 2019 (Aug. 16, 2019), XP051768660, 3 pages, Chapter 2 Discussion, p. 2.

\* cited by examiner

Antenna 0

Antenna 1

Antenna 2

Antenna 3

524

526

504

506

502

510

508

512

514

516

518

520

B3 Tx

B3 Rx0

N41 Rx

B3 Rx1

N41 Rx

B3 Rx2

N41 Rx

N41 Tx

N41 Rx

B3 Rx3

500

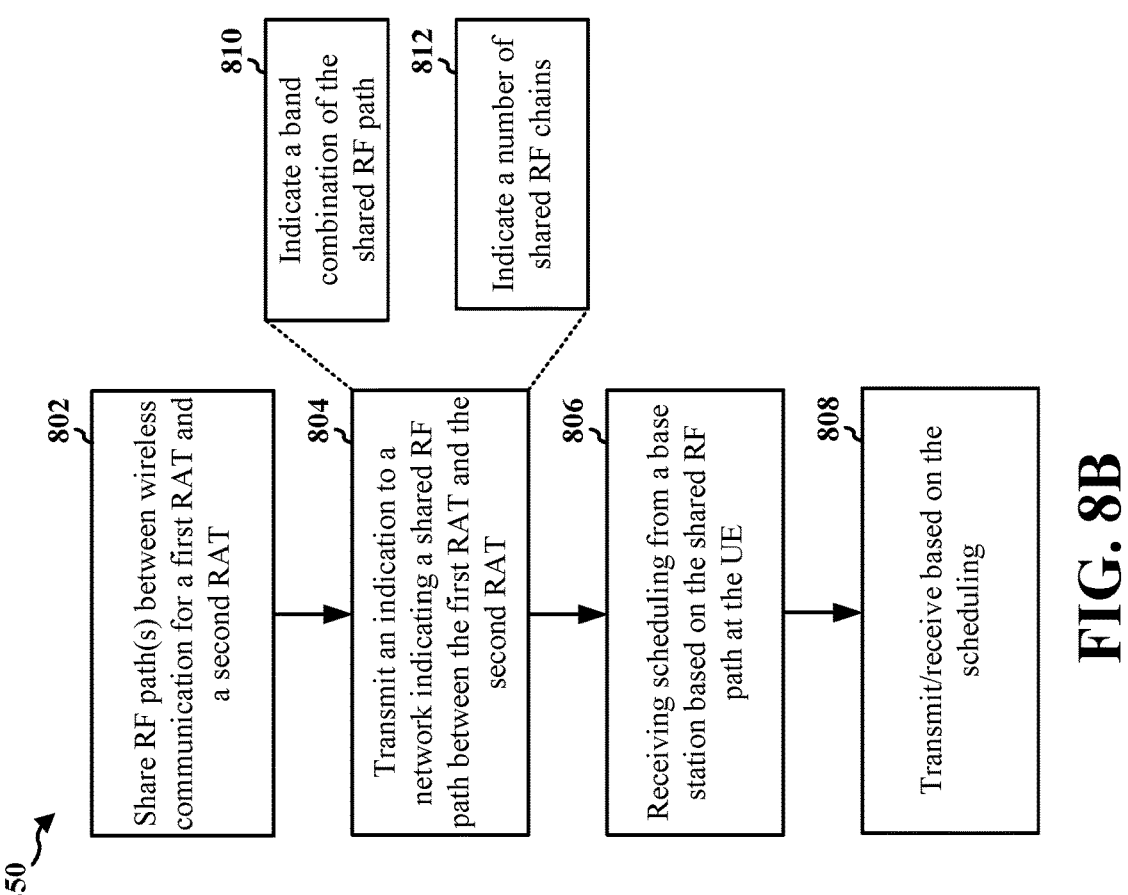

810 — Indicate a band combination of the shared RF path

812 — Indicate a number of shared RF chains

850

802 — Share RF path(s) between wireless communication for a first RAT and a second RAT 804 — Transmit an indication to a network indicating a shared RF path between the first RAT and the second RAT 806 — Receiving scheduling from a base station based on the shared RF path at the UE 808 — Transmit/receive based on the scheduling

FIG. 8B

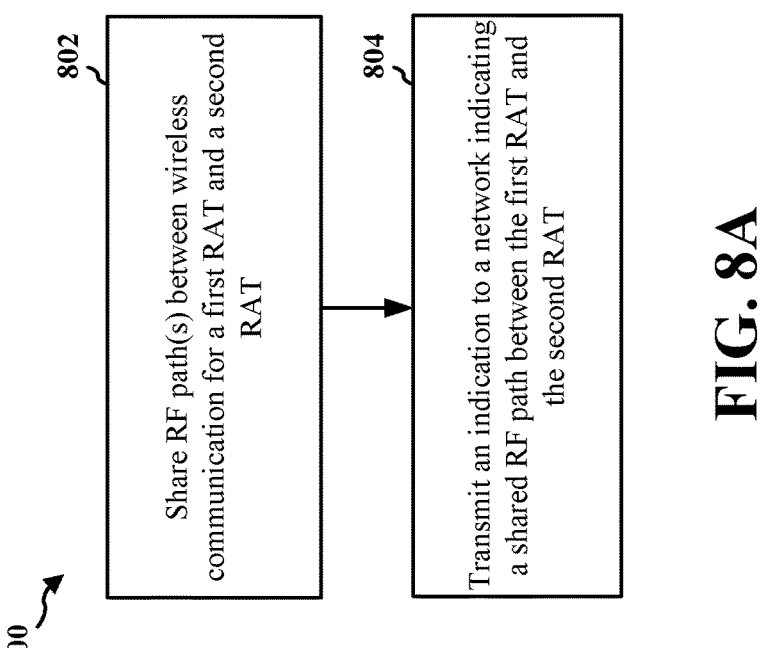

800

802 — Share RF path(s) between wireless communication for a first RAT and a second RAT 804 — Transmit an indication to a network indicating a shared RF path between the first RAT and the second RAT

FIG. 8A

RADIO FREQUENCY SHARED PATH INFORMATION

CROSS REFERENCE TO RELATED APPLICATION(S)

This application is a National Stage Application filed under 35 U.S.C. § 371 of PCT International Application No. PCT/US2021/046737, entitled "RADIO FREQUENCY SHARED PATH INFORMATION" and filed Aug. 19, 2021, which claims the benefit of and priority to Indian Patent Application number 202041036935, entitled "Radio Frequency Shared Path Information" and filed on Aug. 27, 2020, which are expressly incorporated by reference herein in their entirety.

TECHNICAL FIELD

The present disclosure relates generally to communication systems, and more particularly, to wireless communication including a shared radio frequency (RF) path.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. The method may be performed by a user equipment (UE) in some examples. The apparatus shares an RF path between wireless communication for a first radio access technology (RAT) on a first frequency band and a second RAT on a second frequency band. The apparatus transmits an indication, to a network of the first RAT or the second RAT, indicating a shared RF path between the first RAT and the second RAT.

In another aspect of the disclosure, a method, a computer-readable medium, and an apparatus are provided for wireless communication. The method may be performed by a base station in some examples. The apparatus receives an indication from a UE about a shared RF path between a first RAT and a second RAT. The apparatus schedules wireless communication with the UE based on the shared RF path at the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A and 8B are flowcharts of a method of wireless communication including a shared RF path for the wireless communication of different RATs.

DETAILED DESCRIPTION

Figure 1:
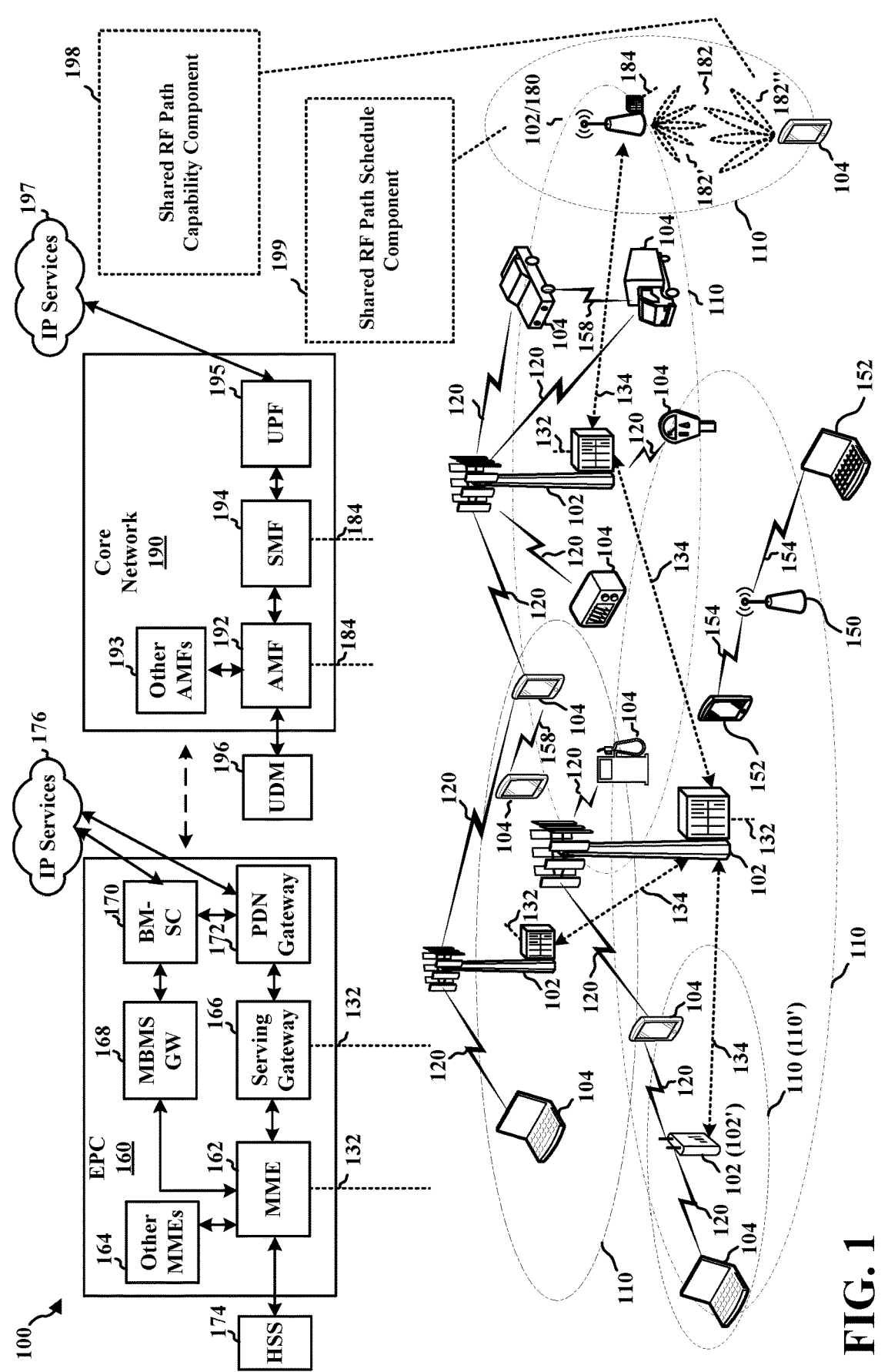
FIG. 1 is a diagram illustrating an example of a wireless communications system and an access network.

A UE may share one or more RF paths between different RATs. For example, the UE may have an RF path that is shared between LTE and NR. The shared RF path may be for a particular frequency band combination, such as B3 for LTE and N41 for NR or B39 for LTE and N41 for NR. The UE may switch the RF path away from one RAT in order to transmit/receive control signaling on the other RAT. For example, the UE may experience blanking on LTE in order to use the RF path to receive NR control signaling and/or to transmit NR SRS. The network may continue to schedule uplink and/or downlink resources for LTE during overlapping subframes, which the UE may be unable to use. Aspects presented herein provide for the UE to transmit RF sharing information to the network informing the network that the UE has one or more shared RF paths between the first RAT and the second RAT. The UE may further indicate one or more frequency band combinations for the shared RF path. The network may use the shared RF path information from the UE to schedule wireless communication for the UE. For example, the base station may schedule LTE communication to avoid NR control resources for the UE or may schedule LTE communication using a reduced number of layers if NR control resources fall within a same subframe. The base station may schedule NR SRS to avoid subframes in which the UE is to receive LTE PSS, SSS, CSR, and/or PRS, for example.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described techniques. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components (e.g., associated with a user equipment (UE) and/or a base station), end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a shared RF path capability component 198 configured to transmit shared RF path information to a network about an RF shared path that is shared between a first RAT and a second RAT. In some aspects, the first and second RATs may correspond to LTE and NR. In certain aspects, the base station 180 may include a shared RF path schedule component 199 configured to receive the information about the shared RF path and to schedule the UE based on the RF shared path. For example, the base station may schedule resources for the first RAT to avoid control signaling on the other RAT. In other examples, the base station may schedule resources for the first RAT with a reduced number of layers in subframes that overlap control resources of the other RAT.

Although the following description may be focused on 5G NR, the concepts described herein may be applicable to other similar areas, such as LTE, LTE-A, CDMA, GSM, and other wireless technologies.

Figures 2A, 2B, 2C, 2D:
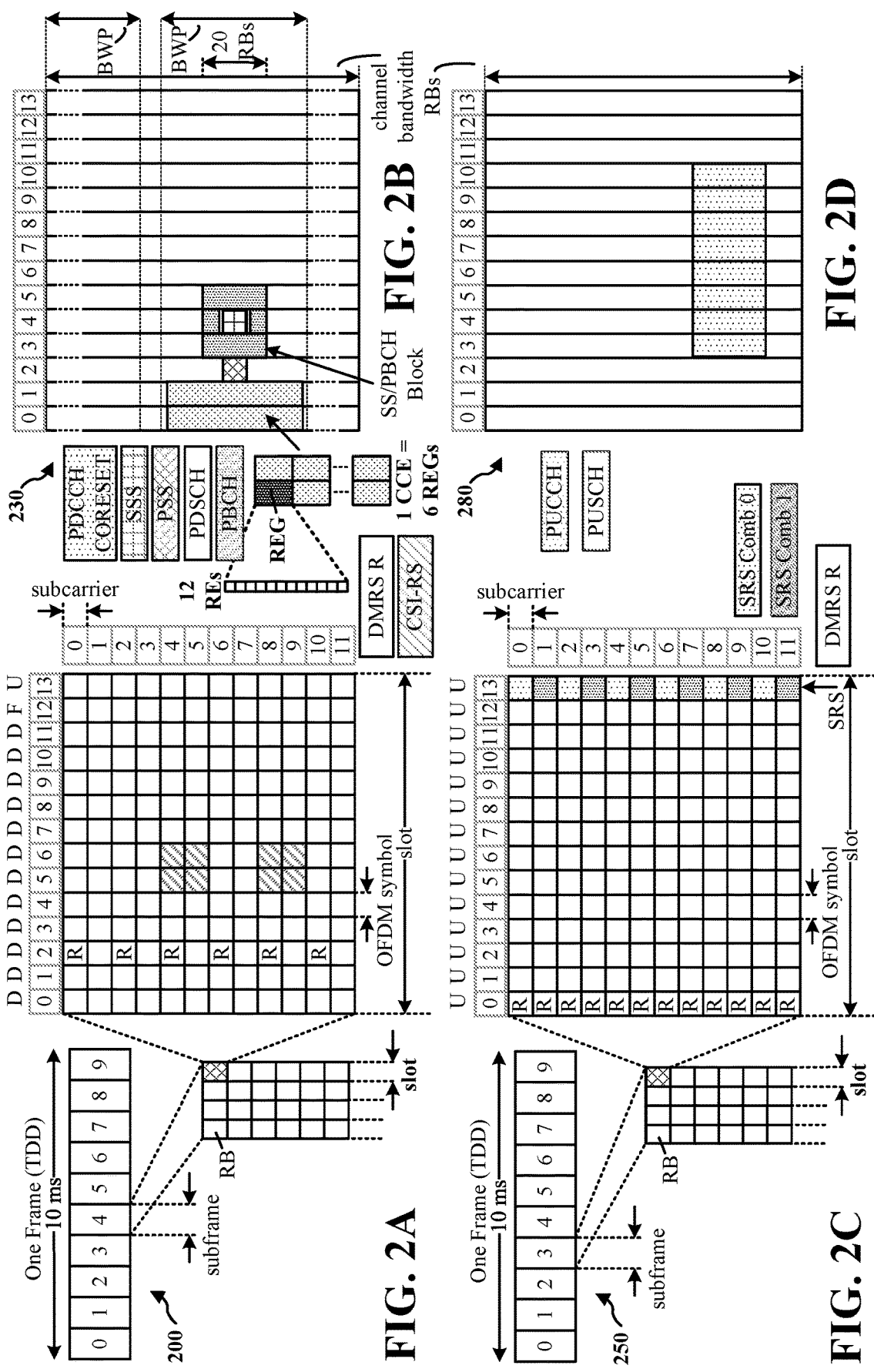
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
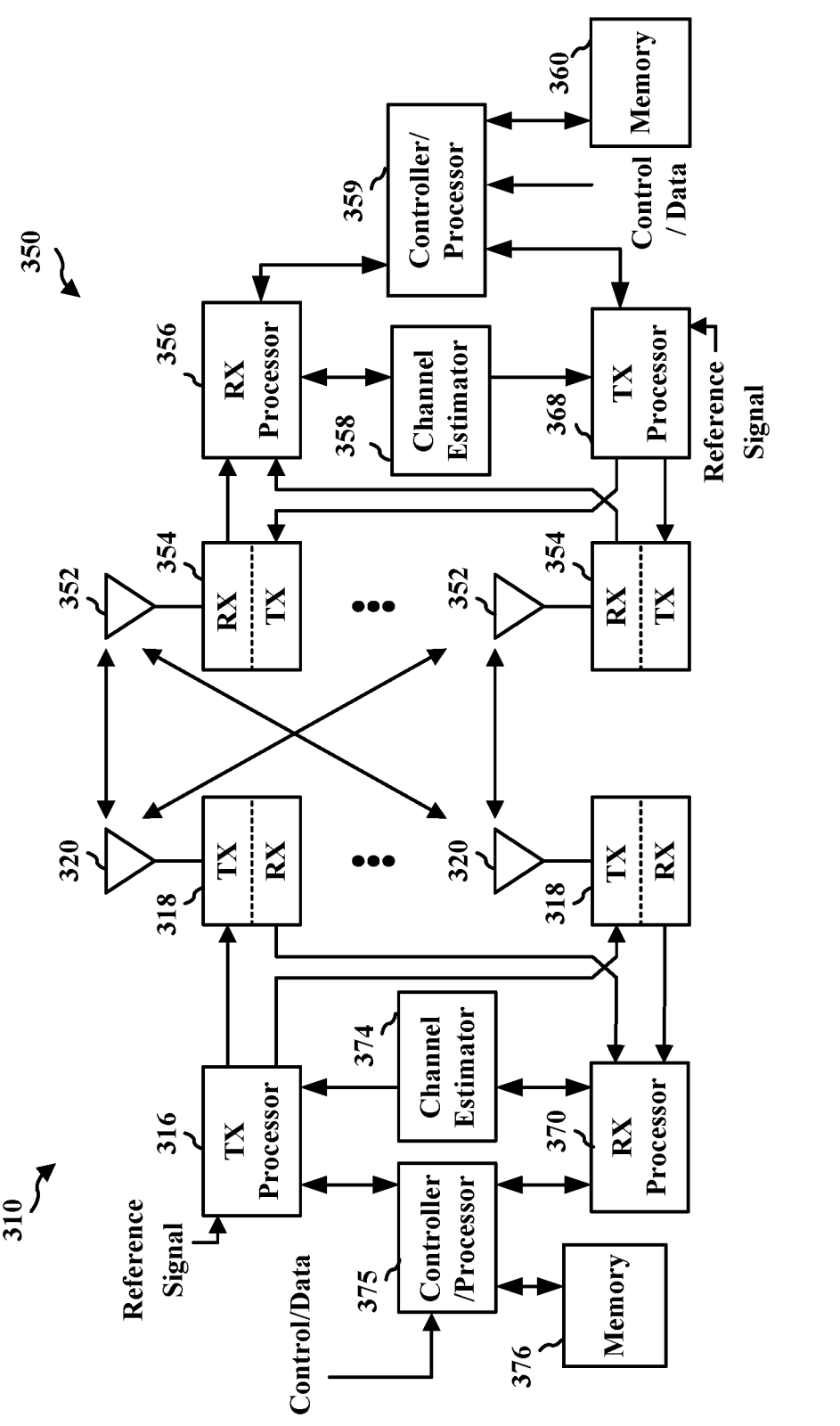
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, the UE 350 may include a shared RF path for exchanging wireless communication based on different RATs. At least one of the TX processor 368, the RX processor 356, and the controller/processor 359 may be configured to perform aspects in connection with the shared RF path capability component 198 of FIG. 1. At least one of the TX processor 316, the RX processor 370, and the controller/processor 375 may be configured to perform aspects in connection with the shared RF path schedule component 199 of FIG. 1, e.g., including scheduling wireless communication with the UE 350 based on a shared RF path at the UE 350.

Figure 4:
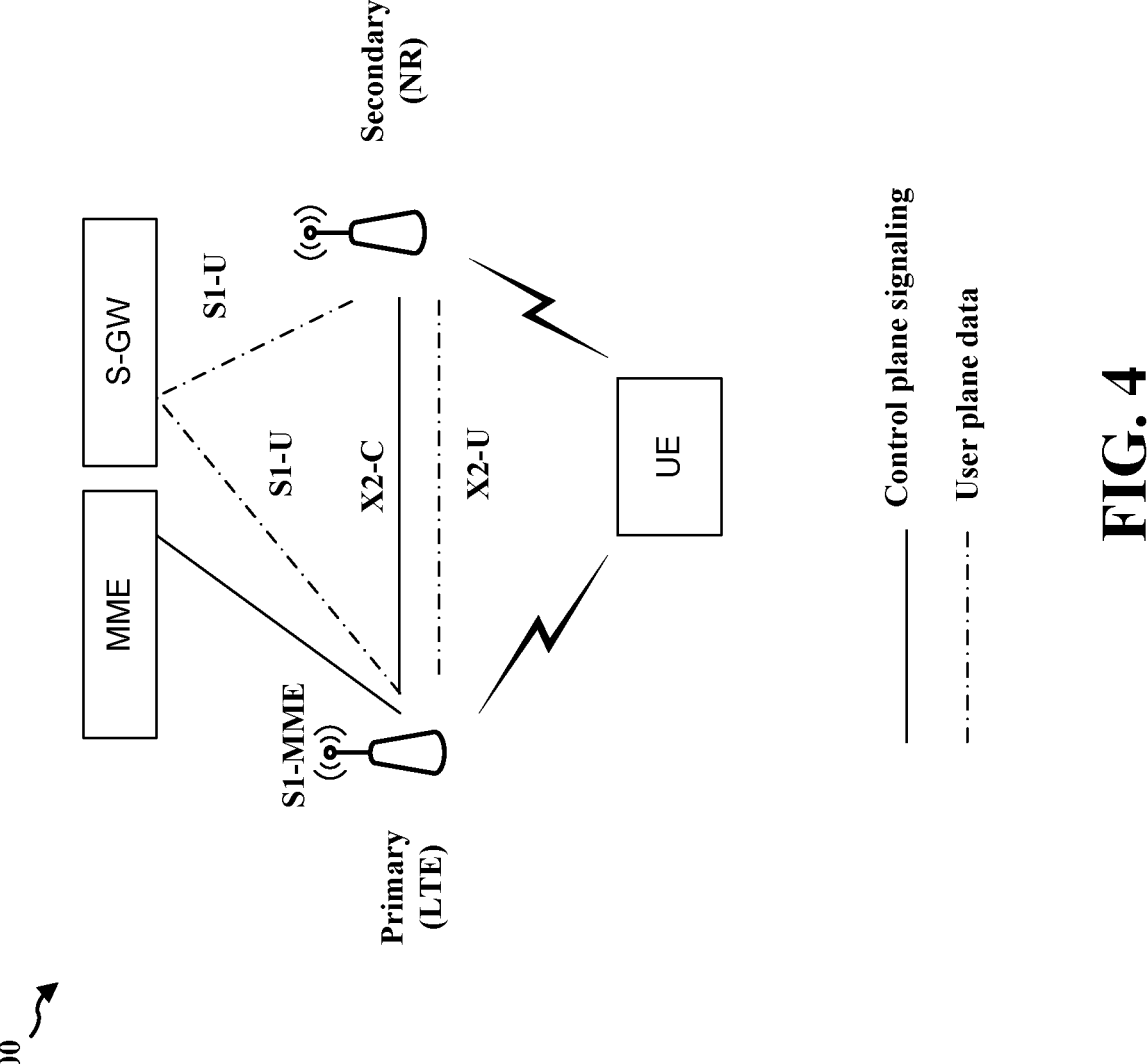
FIG. 4 illustrates an example of dual connectivity for different RATs.

A wireless device may operate based on multiple RATs. In some examples, a UE may employ dual connectivity with multiple RATs. A first RAT may operate as a primary node (MN) (which may be referred to as a master node in some examples) and a second RAT may operate as a secondary node (SN). One example of this multiple RAT communication is Evolved Universal Mobile Telecommunications System (UMTS) Terrestrial Radio Access (E-UTRA) New Radio-Dual Connectivity (EN-DC). Although examples are provided for EN-DC with LTE and NR to illustrate the concepts, the concepts are applicable to other RATs and other dual connectivity scenarios, as well. Another split bearer example is multi-RAT dual connectivity (MR-DC). In an EN-DC configuration, the UE may be connected to an LTE network and then may connect to an NR network via an RRC connection reconfiguration process. The UE communicates with both an LTE node and an NR node, e.g., as illustrated in the EN-DC example 400 in FIG. 4. As illustrated in FIG. 4, the LTE node may have a control plane connection with the LTE core network and may have a control plane connection, e.g., an X2 connection, with the NR node. For the user plane, or data plane, the LTE node may have a user plane connection with the LTE network and the NR network, and the NR node may have a user plane connection with the NR network.

In EN-DC, the different RATs (e.g., LTE and NR) may share some reception (Rx) antenna paths. The RF sharing may be based on a front-end configuration of the UE, e.g., based on a number of antennas for the UE. As an example, NR and LTE may share reception antenna paths for certain band combinations. RF sharing may be based on radio frequency front end (RFFE) parameters of a manufacturer. The parameters may be based on multiple factors. For example, RF chains may be shared between carriers of different RATs (e.g., 5G and 4G, or some other combination of RATs) for some bands. Among other examples, an RF shared chain may be provided between frequency band B3 and frequency band N41 or between B39 frequency band and N41 frequency band, among other examples. As an example, the RF shared chain may be for B3 FDD and N41 TDD or for B39 TDD and N41 TDD. The sharing of RX paths may reduce manufacturing costs for the UE and may help to meet form factor aspects. When control information is scheduled on the shared RF chain, reception or transmission by one RAT may be released in order to transmit or receive the control from the other RAT. For example, data reception or transmission by LTE may be released in order to switch the RF chain to NR for the transmission/reception of control signaling.

A UE may transmit a sounding reference signal (SRS) in a periodic manner to enable a base station to determine an uplink channel quality for the UE. As an example, a UE may transmit an SRS every 5 ms. A UE may perform SRS switching in which the UE switches to different antennas to transmit the SRS, e.g., up to 1T4R. The UE may support SRS antenna switching in a semi-persistent manner, a periodic manner, or an aperiodic manner.

The UE may switch away from transmission and/or reception on a first RAT in order to transmit the SRS on a second RAT if the UE has a shared RF path. For example, the UE may switch away from transmission/reception based on LTE in order to transmit an NR SRS. The NR uplink transmissions during SRS switching may impact LTE downlink activity, for example. Depending on a front-end configuration of the UE, e.g., whether the UE has 4 antennas or 5 antennas, LTE reception may be affected for each SRS event. One or more LTE receptions may be affected. (A better SRS configuration pattern may be employed to reduce the number of LTE subframes affected by the SRS switching.

The NR SRS transmission switching on different antennas may interrupt an LTE Rx path. The problem increases when the periodicity of the SRS, or other control information, is reduced. For example, if an NR SRS is transmitted every 5 ms, 1 subframe will be used for NR every 5 ms, and will be a blanking subframe for LTE. With a periodicity of 5 ms, there may be a 20% blanking impact for uplink or downlink data for LTE, for example.

Figure 5:
FIG. 5 illustrates an example diagram of an RF front end for a UE with shared RF paths.

FIG. 5 illustrates an example of an RF front end diagram 500 showing shared RF chains between LTE and NR. In FIG. 5, the antennas are connected to Rx chains through cross switches 524 and 526. For example, the N41 frequency band may be a time division duplex (TDD) frequency band in FR1 for NR with a range of about 2469-2690 MHz and a bandwidth of 194 MHz. (FR1 450-6000 MHz). B3 is an FDD frequency band for LTE with a range of 1710-1800 MHz. For example, FIG. 5 illustrates that NR Rx 502 may share an RF path with LTE Tx 504 and LTE Rx 506. Thus, reception or transmission of control for NR Rx 502 may lead to interruptions for LTE Tx 504 and/or LTE Rx 506. As well, reception at NR Rx 508 may lead to interruptions for LTE Rx 510, reception at NR Rx 512 may lead to interruptions for LTE Rx 514. As another example, NR reception at NR Rx 518 or NR transmission at NR Tx 516 may interrupt LTE reception at LTE Rx 520. The daisy chaining of antennas may lead to interruption at one RAT in order to switch the RF path to transmission/reception of control for the other RAT, e.g., interrupting LTE for the transmission/reception of NR control. The LTE path may be interrupted completely or may be reduced, e.g., reduced from using one or more antennas. Although the example is described for LTE and NR to illustrate the concept, aspects presented herein may be applied for other combinations of RATs, as well.

The interruption of the LTE Rx path may cause function and performance loss for LTE. For example, the UE may fail to detect LTE cells, may experience a degraded estimation of RSRP, and/or may have degraded performance in decoding PBCH, etc.

One problem that may occur in the example in FIG. 5 is LTE operation blanking due to one of the RF chains that are shared with NR. The UE may experience LTE operation blanking during the collision time in which the UE is scheduled for LTE data transmission or reception and with transmission/reception of control for NR. The LTE blanking may impact up to 20% throughout impact, in some examples.

Another example problem is the collision of resources in which the UE may miss PSS/SSS and/or PBCH for LTE, or other information that may be important for decoding performance at the UE, based on switching to receive or transmit control for NR. The collision of resources and missed LTE signals may reduce LTE Performance in terms of RSRP/SNR estimation, PBCH decoding, etc. For example, a missed PSS may lead to the detection performance loss. A missed CRS may lead to inaccurate RSRP estimation, e.g., lower than actual RSRP.

Another example problem is that the network is not aware of the RF Sharing information of the UE's modem. Therefore, the network may continue to schedule the UE for LTE communication, e.g., either downlink or uplink, during times that collide with NR control resources. The UE may not be able to use the scheduled LTE resources, and the radio resources are wasted. For example, the UE may not be able to transmit uplink data for LTE using scheduled resources and may wait for additional resources to be scheduled. Similarly, the UE may not be able to receive scheduled downlink data, and the base station may schedule a retransmission for the UE. If the base station transmits scheduling information for LTE while the UE is using the RF path for NR, the UE is unaware of the scheduled transmission and does not use the resources scheduled after the NR control for LTE transmission or reception. The scheduled resources may be wasted, as the UE is limited from using the resources due to the RF path sharing at the UE.

Thus, UE and network performance may be affected by the RF sharing at the UE. Aspects presented herein help to avoid wasted resource scheduling by the network and may improve power savings at the UE.

Figures 6A, 6B:
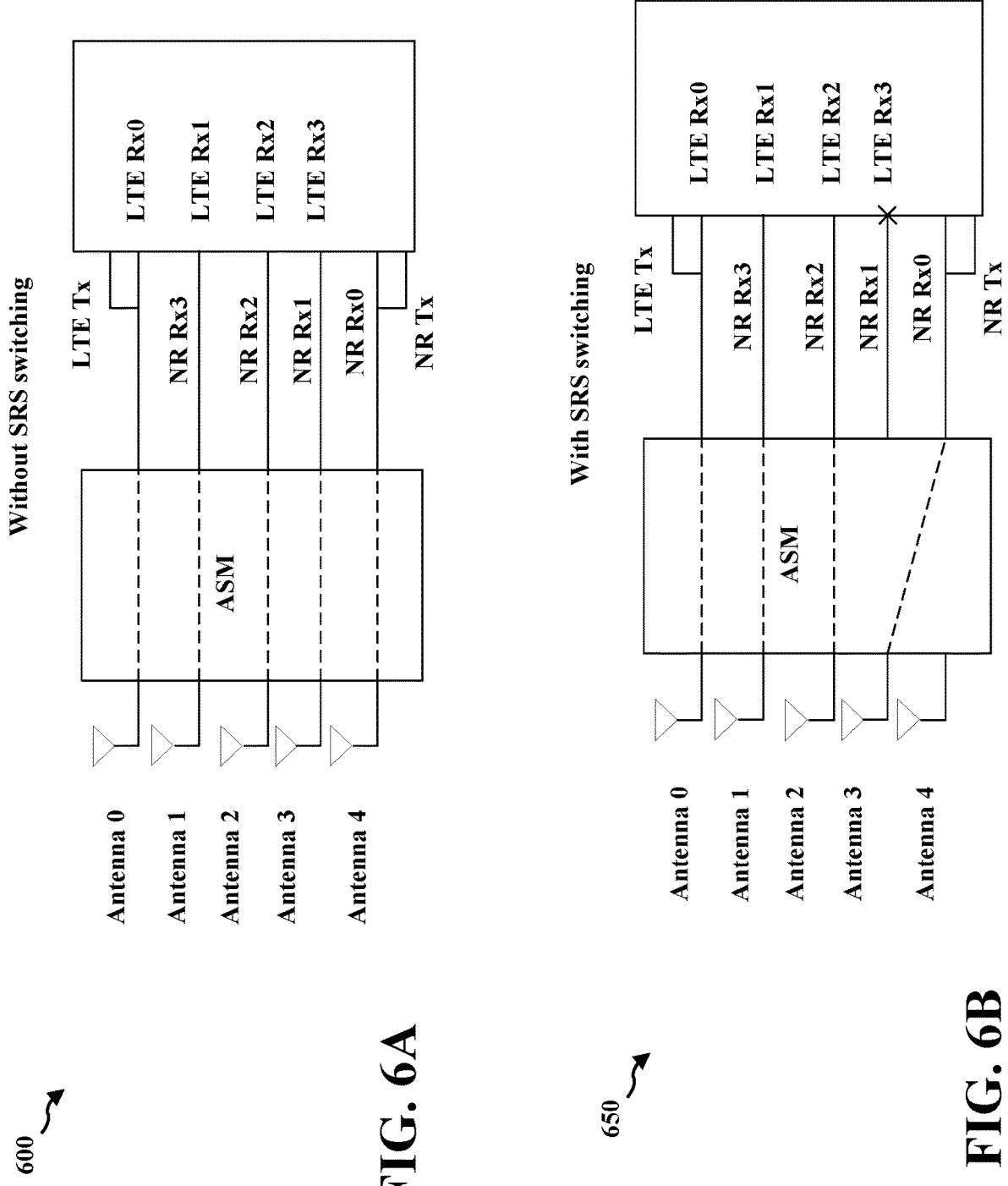
FIG. 6A illustrates an RF diagram without SRS switching.
FIG. 6B illustrates an RF diagram with SRS switching.

FIG. 6A illustrates an example RF path diagram 600 without SRS switching. In FIG. 6A, Antenna 4 may be used for NR reception and NR transmission. The UE may transmit SRS using antenna 4. FIG. 6B illustrates an example RF path diagram 650 with SRS switching. For example, the UE may switch to antenna 4, as illustrated, in order to transmit SRS for NR. Thus, LTE reception on antenna 4 may be interrupted in order for the UE to transmit the SRS for NR with SRS switching. Although FIG. 6B illustrates a single antenna being impacted, NR control activity may impact multiple antennas that are shared for LTE transmission/reception.

Figure 7:
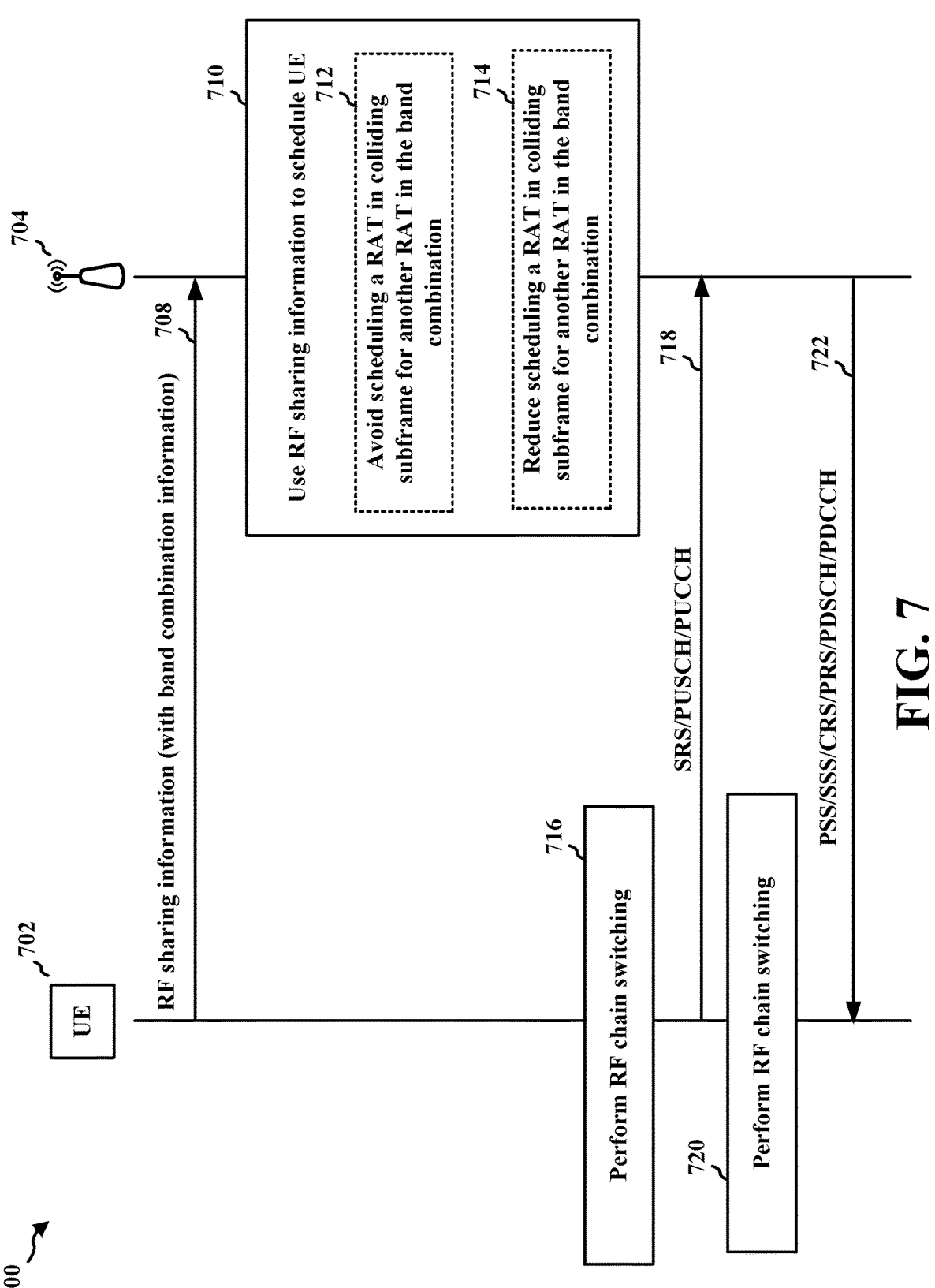
FIG. 7 illustrates an example communication flow between a UE and a network including the provision of capability information about RF path sharing at the UE.

As presented herein, the UE may provide RF shared path information to the network to inform the network about a shared path between a first RAT and a second RAT, e.g., between NR and LTE. FIG. 7 illustrates an example communication flow 700 between a UE 702 and a network entity, such as a base station 704. As illustrated at 708, the UE may provide RF sharing information to the base station 704 to inform the base station that the UE shared one or more RF chains between multiple RATs. The RF sharing may be for a particular band combination of a first frequency band for the first RAT (e.g., LTE) and a second frequency band for a second RAT (e.g., NR). The UE may indicate, at 708, to the network the band combinations for the two RATs (e.g., LTE and NR) that share the RF chains. The UE may provide the indication in UE capability signaling, e.g., in RRC signaling to a base station. For example, the UE may transmit an information element (IE) in a UE capability information message, e.g., 708, that provides one or more LTE and NR band combination having a shared RF chain at the UE front end. In some examples, the information element may be referred to as an LTE NR shared RF band information (e.g., "LTE_NR_Shared_RF_band info"), although the IE may also be referred to by a different name.

The capability signaling may be indicated in a UE-NR capability, in some examples. The UE may indicate whether or not the UE supports RF sharing for LTE and NR, for example. In other examples, the capability signaling may be indicated support for a different capability. The UE may indicate whether or not the UE supports RF sharing for a different combination of RATs. The UE may provide one or more band combinations for which the RF sharing is applicable. For example, the UE may provide a list of band combinations for which the UE performs RF sharing. The RF sharing band combination list may indicate an LTE NR shared path combination including the LTE frequency band and the NR frequency band. The UE may further indicate shared RF chain information for each combination, such as how many shared RF chains are shared at the UE for the particular frequency band combination. The UE may indicate one or more RF chains that are shared for the particular frequency band combination.

The information may enable the network of the RF sharing and potential conflict between resources for the two RATs, e.g., LTE resources and NR resources that collide (e.g., overlap in time) for a shared RF path. For example, at 710, the network may use the information from the UE to schedule LTE communication for the UE to avoid scheduling that overlaps in time with NR control resources or higher priority NR resources. For example, if the UE indicates a band combination of B3 and N41, the base station may avoid scheduling LTE communication in the B3 frequency band that overlaps with NR communication in the N41 frequency band, such as NR control, e.g., as at 712. In order examples, the network may use the information from the UE to reduce scheduling that overlaps the colliding NR resources, e.g., at 714. For example, if the base station would schedule the UE for 4×4 LTE communication, e.g., for reception or transmission by RF chains or 4 antennas, the base station may reduce the scheduling to be based on 2 RF chains or 2 antennas. For example, the base station may reduce downlink LTE scheduling from 4×4 to 4×2 or 2×2. Thus, the base station may schedule the LTE communication for the UE based on a reduced number of layers, e.g., 2 layers rather than 4 layers, based on the shared RF chain. The reduction in the layers may be based on how many RF chains are shared between the two RATs. The information from the UE may indicate that the UE may have a reduced number of RF chains available for LTE communication or that the UE may have no RF chains available for LTE communication that collides with NR resources. If the UE indicates a reduced number of RF chains, the base station may schedule the UE using reduced layers. If the UE indicates that each of the RF chains are shared, the base station may avoid scheduling the UE for LTE communication that overlaps with NR communication such as NR control.

The base station may avoid scheduling, at 712, or may reduce scheduling, at 714, for the first RAT for the UE in a subframe in which the UE with transmit or receive based on the other RAT. For example, the base station may avoid scheduling, or reduce a number of layers for scheduling, for LTE communication for the UE in subframes in which the UE is to transmit/receive NR control signaling. An example of NR control signaling includes SRS transmissions. In some examples, the SRS transmissions may include SRS antenna switching.

By scheduling the UE based on the shared RF path information, the base station may schedule resources more efficiently for the UE by avoiding scheduling the UE for communication that the UE is not able to receive/transmit. The base station may also avoid retransmissions due to blanking operation at the UE.

Alternatively, or additionally, the network may adjust scheduling of the UE for NR, at 712, in order to avoid particular subframes for LTE. For example, the network may avoid scheduling the UE for NR SRS and/or control scheduling during particular subframes for LTE communication for the UE, at 712 such as subframes for LTE PSS/SSS, CRS, and/or PRS. PSS, SSS, CRS, and PRS, are merely examples of signaling that the network may schedule to avoid on one of the RATs.

As illustrated at 716, the UE may perform RF chain switching to a first RAT, at 716, in order to transmit SRS, PUSCH, and/or PUCCH of a first RAT. The UE may transmit the SRS, PUSCH and/or PUCCH based on scheduling from the base station 704 that takes into account the shared RF chain at the UE. At 720, the UE may perform RF chain switching to the other RAT and may receive downlink signaling 722 based on the second RAT, such as PSS, SSS, CRS, PRS, PDSCH, or PDCCH.

Although the examples described herein use the example of NR and LTE in order to illustrate the concept, the aspects may also be applied to other combinations of RATs for which the UE may share an RF chain.

The aspects presented herein help to avoid resource waste and performance degradation that may occur with RF shared paths for EN-DC, for example. The network may schedule resources more efficiently by informed scheduling, or smart scheduling, based on UE capability information that informs the network of the RF chain sharing at the UE. The aspects presented herein may reduce blanking and retransmissions for the UE and may improve reception of PSS, SSS, CRS, etc. The network may avoid downlink and/or uplink retransmissions. Resources that may have been scheduled but not used by the UE may instead be scheduled for another UE. The aspects may also improve power savings at the UE. The base station may schedule one RAT in order to avoid resources of another RAT, such as for important signaling. For example, the network may avoid scheduling NR resources that would overlap in a same subframe with an LTE E911 call using PRS to determine a user's location in connection with an emergency call. Thus, the network may improve scheduling of PSS, SSS, CRS, and/or PRS based on the RF sharing information provided by the UE.

FIG. 8A is a flowchart 800 of a method of wireless communication. The method may be performed by a UE (e.g., the UE 104, 350, 702; the apparatus 802). The method may enable the UE to provide information that helps the network in scheduling communication with the UE in a way that improves the efficient use of wireless resources, improves battery savings at the UE, and/or improves the reception of some signals at the UE.

At 802, the UE shares an RF path between wireless communication for a first RAT on a first frequency band and a second RAT on a second frequency band. FIGS. 5 and 6B illustrate examples of RF path sharing between different RATs for a UE RF front end, for example. The RF path sharing may be performed, e.g., by the RF path sharing component 940 of the apparatus 902 in FIG. 9. Among other examples, the first RAT may be LTE and the second RAT may be NR.

At 804, the UE transmits an indication, to a network of the first RAT or the second RAT, indicating a shared RF path between the first RAT and the second RAT. The UE may transmit the indication in a UE capability message. The transmission of the indication may be performed, e.g., by the capability indication component 942 of the apparatus 902 in FIG. 9.

FIG. 8B illustrates a flowchart 850 of a method of wireless communication. The method may include aspects described in connection with FIG. 8A. The method may be performed by a UE (e.g., the UE 104, 350, 702; the apparatus 802). Aspects that have been described in connection with FIG. 8A, are shown with the same reference number. As illustrated in FIG. 8B, he UE may further indicate a band combination of the shared RF path including the first frequency band and the second frequency band, at 810 in connection with the indication of the shared RF path, at 804. The indication of a band combination for a shared RF path is described in connection with 708 in FIG. 7. UE may further indicate a number of RF shared chains, as illustrated at 812 in FIG. 8B. The transmission of the indication(s) may be performed, e.g., by the capability indication component 942 of the apparatus 902 in FIG. 9.

As illustrated at 806, the UE may receive scheduling from the base station based on the shared RF path at the UE, e.g., after transmitting the indication to the network indicating the shared RF path, at 804. The scheduling may avoid resources for the first RAT on the first frequency band in a time period that overlaps communication for the second RAT on the second frequency band, e.g., such as described in connection with 712 in FIG. 7. The scheduling may include a reduced number of layers for the first RAT on the first frequency band in a time period that overlaps communication for the second RAT on the second frequency band, e.g., such as described in connection with 714. For example, the scheduling may include a reduced number of layers for the first RAT based on an amount, e.g. how many, RF chains are shared between the first RAT and the second RAT. The scheduling may avoid a retransmission for the first RAT on the first frequency band in a time period that overlaps communication for the second RAT on the second frequency band. The scheduling may avoid scheduling an SRS for the first RAT on the first frequency band in a time period that overlaps a synchronization signal or reference signal for the second RAT on the second frequency band. The reference signal may include one or more of a PRS or a CRS. The reception of the scheduling may be performed, e.g., by the schedule component 944 and/or the reception component 930 of the apparatus 902 in FIG. 9.

For example, the scheduling may avoid scheduling LTE data reception and/or transmission in one or more subframes in which NR control is scheduled, e.g., as illustrated at 808 in FIG. 8B. Transmission may be performed, e.g., by the transmission component 934 of the apparatus 902 in FIG. 9, and reception may be performed, e.g., by the reception component 930 of the apparatus 902 in FIG. 9. In some examples, the base station may avoid scheduling SRS or control (e.g., PUCCH/PDCCH) for NR during resources that overlap with PSS, SSS, CRS, and/or PRS for LTE.

The UE may further transmit and/or receive the wireless communication based on the scheduling, such as described in connection with any of 716, 718, 720, or 722.

Figure 9:
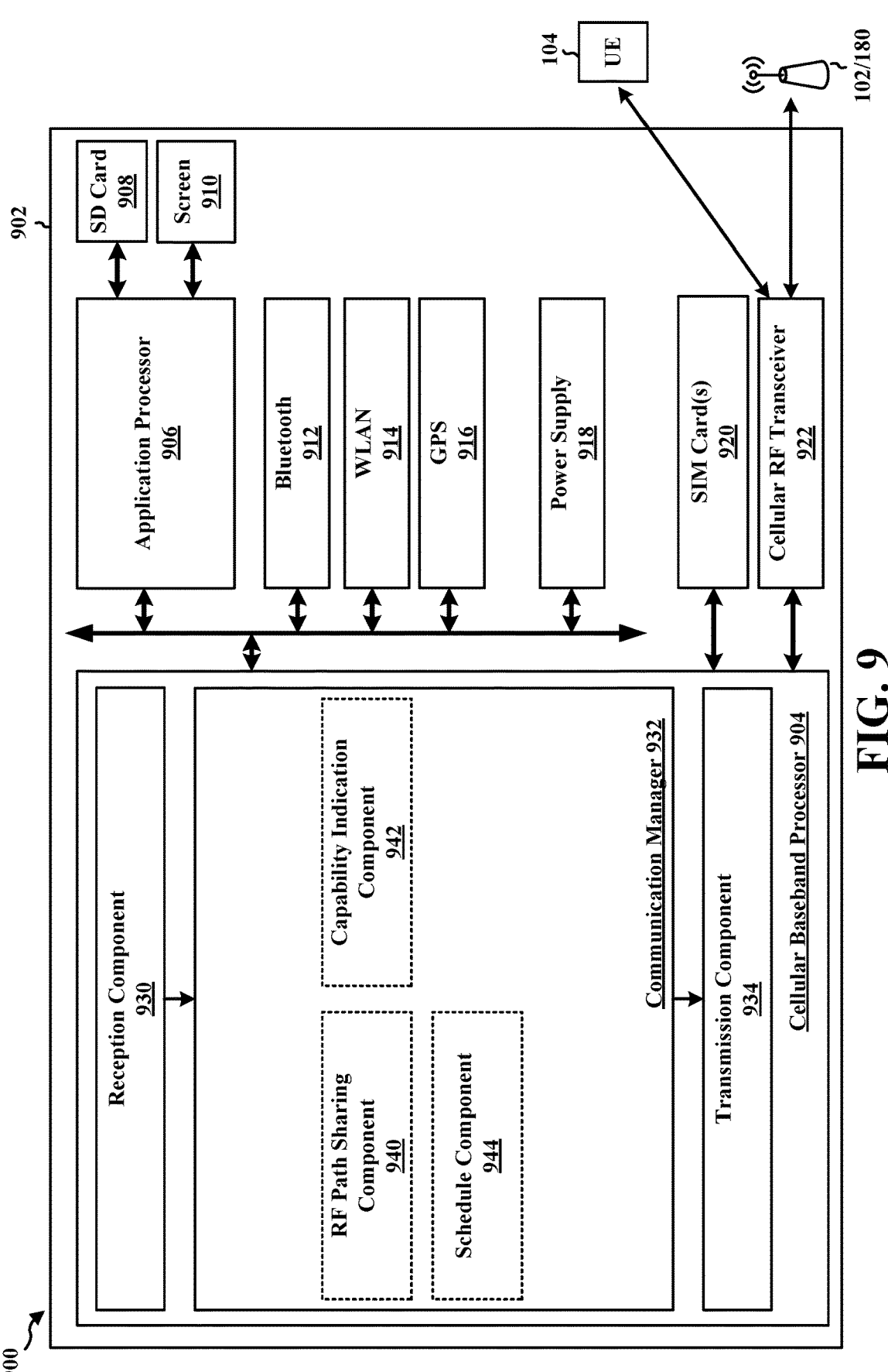
FIG. 9 is a diagram illustrating an example of a hardware implementation for an example apparatus configured for wireless communication including a shared RF path for the wireless communication of different RATs.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/ memory. The computer-readable medium/memory may be non-transitory. The cellular baseband processor 904 is responsible for general processing, including the execution of software stored on the computer-readable medium/ memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the cellular baseband processor 904, and in another configuration, the apparatus 902 may be the entire UE (e.g., see 350 of FIG. 3) and include the additional modules of the apparatus 902.

The communication manager 932 includes an RF path sharing component 940 that is configured to perform RF path sharing, e.g., as described in connection with 802. The communication manager 932 further includes a capability indication component 942 that is configured to transmit an indication of the RF path sharing for multiple RATs e.g., as described in connection with 804. The communication manager 932 further includes a schedule component 944 that is configured to receive scheduling based on the RF path sharing indicated to the network, e.g., as described in connection with 806.

The apparatus may include additional components that perform each of the blocks of the algorithm in the flowcharts of FIG. 8A or 8B and/or the aspects performed by the UE 702 in FIG. 7. As such, each block in the flowcharts of FIG. 8A or 8B and/or the aspects performed by the UE 702 in FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for sharing a RF path between wireless communication for a first RAT on a first frequency band and a second RAT on a second frequency band and means for transmitting an indication, to a network of the first RAT or the second RAT, indicating a shared RF path between the first RAT and the second RAT. The apparatus 902 may further include means for receiving scheduling from the base station based on the shared RF path at the UE. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
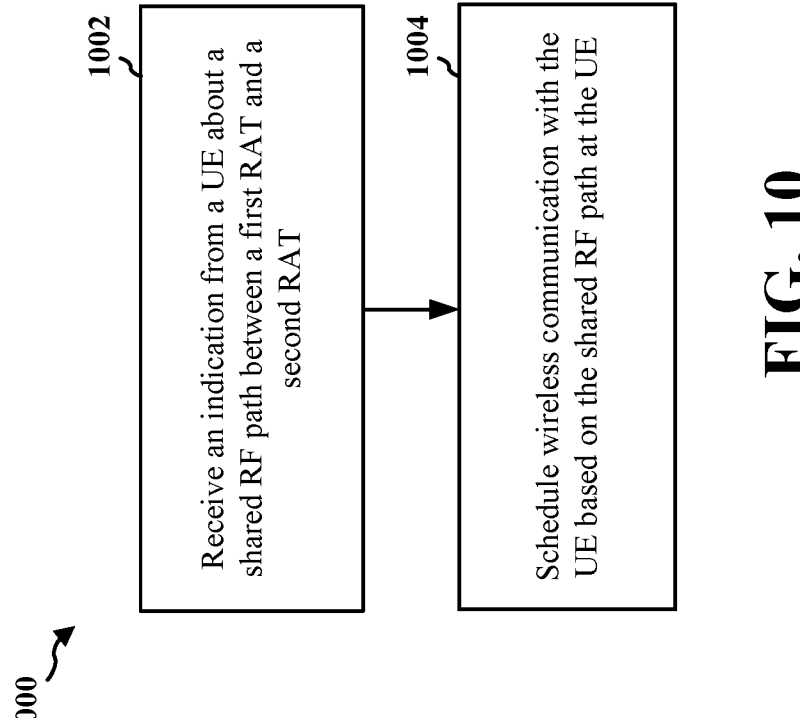
FIG. 10 is a flowchart of a method of wireless communication including the reception of an indication from a UE about a shared RF path for wireless communication of different RATs.

FIG. 10 is a flowchart 1000 of a method of wireless communication. The method may be performed by a base station (e.g., the base station 102, 180, 310, 704; the apparatus 1102). The method may enable a network to more efficiently schedule resources, to avoid retransmissions, and/ or to schedule a UE to ensure reception/transmission of a particular wireless communication based on a first RAT.

At 1002, the base station receives an indication from a UE about a shared RF path between a first RAT and a second RAT. The indication may further indicate a band combination of the shared RF path including the first frequency band and the second frequency band, e.g., such as described in connection with 708 in FIG. 7. The indication may further indicate a number of RF shared chains. The base station may receive the indication in a UE capability message. Among other examples, the first RAT may be LTE and the second RAT may be NR. The reception of the indication may be performed, e.g., by the capability indication component 1142 and/or the reception component 1130 of the apparatus 1102 in FIG. 11.

At 1004, the base station schedules wireless communication with the UE based on the shared RF path at the UE. The scheduling may avoid resources for the first RAT on the first frequency band in a time period that overlaps communication for the second RAT on the second frequency band, e.g., such as described in connection with 712 in FIG. 7. The scheduling may include a reduced number of layers for the first RAT on the first frequency band in a time period that overlaps communication for the second RAT on the second frequency band, e.g., such as described in connection with 714. For example, the scheduling may include a reduced number of layers for the first RAT based on an amount, e.g. how many, RF chains are shared between the first RAT and the second RAT. The scheduling may avoid a retransmission for the first RAT on the first frequency band in a time period that overlaps communication for the second RAT on the second frequency band. The scheduling may avoid scheduling an SRS for the first RAT on the first frequency band in a time period that overlaps a synchronization signal or reference signal for the second RAT on the second frequency band. The reference signal may include one or more of a PRS or a CRS. The scheduling may be performed, e.g., by the schedule component 1144 and/or the transmission component 1134 of the apparatus 1102 in FIG. 11.

For example, the scheduling may avoid scheduling LTE data reception and/or transmission in one or more subframes in which NR control is scheduled. In some examples, the base station may avoid scheduling SRS or control (e.g., PUCCH/PDCCH) for NR during resources that overlap with PSS, SSS, CRS, and/or PRS for LTE.

Figure 11:
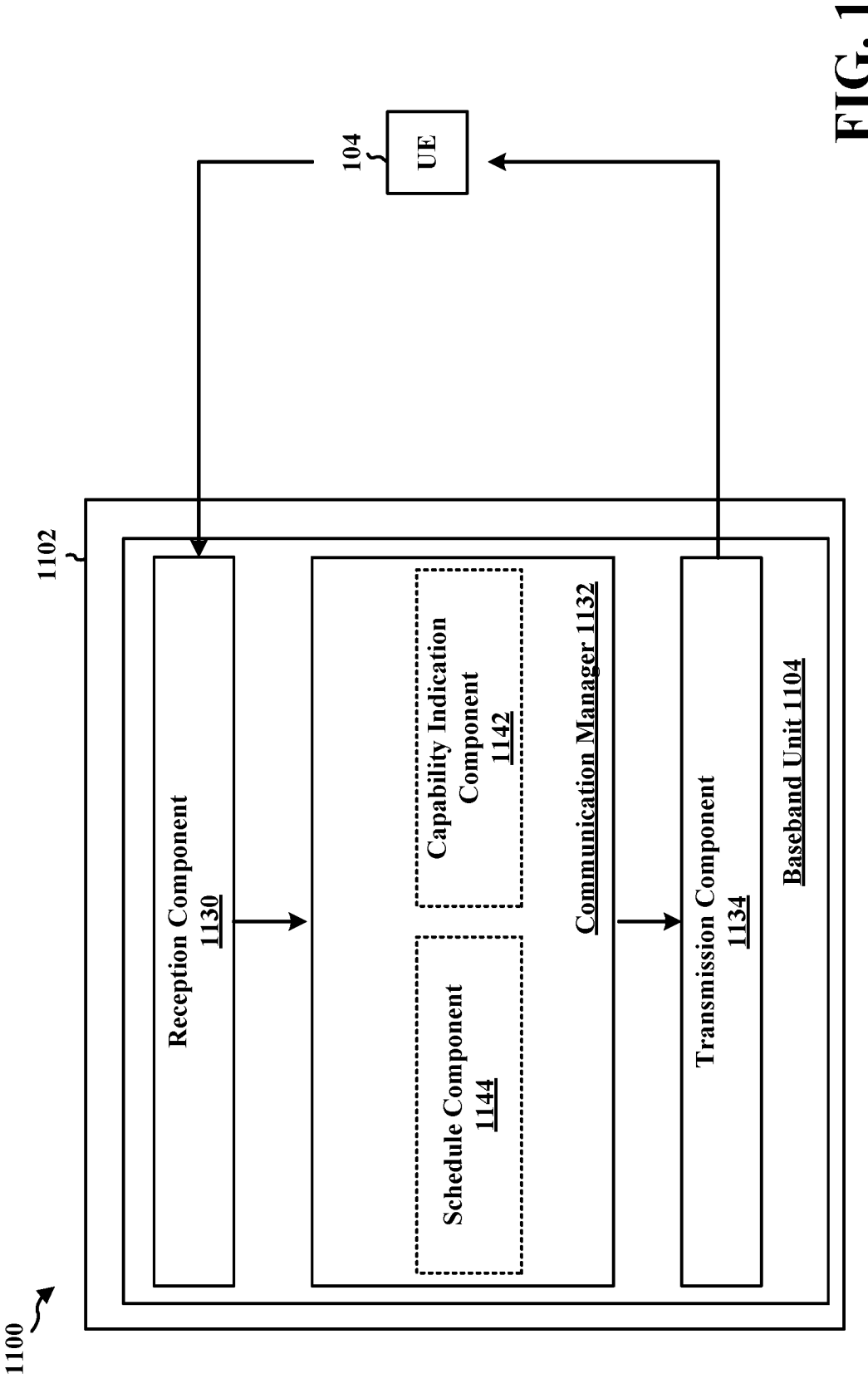
FIG. 11 is a diagram illustrating an example of a hardware implementation for an example apparatus configured for reception of an indication from a UE about a shared RF path for wireless communication of different RATs.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a capability indication component 1142 that receives an indication from a UE about a shared RF path between a first RAT and a second RAT, e.g., as described in connection with 1002. The communication manager 1132 further includes a schedule component 1144 that schedules the UE based on the shared RF path, e.g., as described in connection with 1004.

The apparatus may include additional components that perform each of the blocks of the algorithm in the flowchart of FIG. 10 and/or the aspects performs by the base station 704 in FIG. 7. As such, each block in the flowchart of FIG. 10 and/or the aspects performs by the base station 704 in FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for sharing a RF path between wireless communication for a first RAT on a first frequency band and a second RAT on a second frequency band; and means for transmitting an indication, to a network of the first RAT or the second RAT, indicating a shared RF path between the first RAT and the second RAT. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and aspects thereof may be combined with aspects of other examples or teaching described herein, without limitation.

Aspect 1 is a method of wireless communication at a UE, comprising: sharing an RF path between wireless communication for a first RAT on a first frequency band and a second RAT on a second frequency band; and transmitting an indication, to a network of the first RAT or the second RAT, indicating a shared RF path between the first RAT and the second RAT.

In aspect 2, the method of aspect 1 further includes that the UE further indicates a band combination of the shared RF path including the first frequency band and the second frequency band.

In aspect 3, the method of aspect 1 or aspect 2 further includes that the UE further indicates a number of RF shared chains.

In aspect 4, the method of any of aspects 1-3 further includes that the UE transmits the indication in a UE capability message.

In aspect 5, the method of any of aspects 1-4 further includes that the UE further indicates a band combination of the shared RF path including the first frequency band and the second frequency band, the method further comprising: receiving scheduling from the base station based on the shared RF path at the UE.

In aspect 6, the method of aspect 5 further includes that the scheduling avoids resources for the first RAT on the first frequency band in a time period that overlaps communication for the second RAT on the second frequency band.

In aspect 7, the method of any of aspects 5 or 6 further includes that the scheduling includes a reduced number of layers for the first RAT on the first frequency band based on an amount of RF chains that are shared between the first RAT and the second RAT.

In aspect 8, the method of any of aspects 5-7 further includes that the scheduling avoids a retransmission for the first RAT on the first frequency band in a time period that overlaps communication for the second RAT on the second frequency band.

In aspect 9, the method of any of aspects 5-8 further includes that the scheduling avoids scheduling an SRS for the first RAT on the first frequency band in a time period that overlaps a synchronization signal or reference signal for the second RAT on the second frequency band.

In aspect 10, the method of aspect 9 further includes that the reference signal includes one or more of a PRS or a CRS.

Aspect 11 is a device including one or more processors and one or more memories in electronic communication with the one or more processors storing instructions executable by the one or more processors to cause the device to implement a method as in any of aspects 1-10.

Aspect 12 is a system or apparatus including means for implementing a method or realizing an apparatus as in any of aspects 1-10.

Aspect 13 is a non-transitory computer readable medium storing instructions executable by one or more processors to cause the one or more processors to implement a method as in any of aspects 1-10.

Aspect 14 is a method of wireless communication at a base station, comprising: receiving an indication from a UE about a shared RF path between a first RAT and a second RAT; and scheduling wireless communication with the UE based on the shared RF path at the UE.

In aspect 15, the method of aspect 14 further includes that the indication further indicates a band combination of the shared path including the first frequency band and the second frequency band.

In aspect 16, the method of aspect 14 or aspect 15 further includes that scheduling the wireless communication with the UE based on the shared RF path at the UE includes avoiding scheduling resources for the first RAT on the first frequency band in a time period that overlaps communication for the second RAT on the second frequency band.

In aspect 17, the method of any of aspects 14-16 further includes that scheduling the wireless communication with the UE based on the shared RF path at the UE includes scheduling a reduced number of layers for the first RAT on the first frequency band based on an amount of RF chains that are shared between the first RAT and the second RAT In aspect 18, the method of any of aspects 14-17 further includes that scheduling the wireless communication with the UE based on the shared RF path at the UE includes avoiding scheduling a retransmission for the first RAT on the first frequency band in a time period that overlaps communication for the second RAT on the second frequency band.

In aspect 19, the method of any of aspects 14-18 further includes that scheduling the wireless communication with the UE based on the shared RF path at the UE includes avoiding scheduling an SRS for the first RAT on the first frequency band in a time period that overlaps a synchronization signal or reference signal for the second RAT on the second frequency band.

In aspect 20, the method of aspect 19 further includes that the reference signal includes one or more of a PRS or a CRS.

In aspect 21, the method of any of aspects 14-20 further includes that the indication further indicates a number of RF shared chains.

In aspect 22, the method of any of aspects 14-21 further includes that the base station receives the indication in a UE capability message.

Aspect 23 is a device including one or more processors and one or more memories in electronic communication with the one or more processors storing instructions executable by the one or more processors to cause the device to implement a method as in any of aspects 14-22.

Aspect 24 is a system or apparatus including means for implementing a method or realizing an apparatus as in any of aspects 14-22.

Aspect 25 is a non-transitory computer readable medium storing instructions executable by one or more processors to cause the one or more processors to implement a method as in any of aspects 14-22.

What is claimed is:

1. An apparatus for wireless communication at a user equipment (UE), comprising:
memory; and
at least one processor coupled to the memory and configured to:
share a radio frequency (RF) path between wireless communication for a first radio access technology (RAT) on a first frequency band and a second RAT on a second frequency band, wherein the RF path is based on a number of RF shared chains that are shared between the first RAT on the first frequency band and the second RAT on the second frequency band;
transmit an indication, to a network of the first RAT or the second RAT, wherein the indication indicates the number of the RF shared chains for the shared RF path between the first RAT and the second RAT and a list of frequency band combinations associated with the shared RF path including the first frequency band and the second frequency band; and
receive a configuration for dual connectivity based on the first RAT and the second RAT.

2. The apparatus of claim 1, wherein the indication is comprised in a UE capability message.

3. The apparatus of claim 1, wherein the memory and the at least one processor are further configured to:
indicate a band combination of the shared RF path including the first frequency band and the second frequency band, and
receive scheduling from a base station based on the shared RF path at the UE.

4. The apparatus of claim 3, wherein the scheduling avoids resources for the first RAT on the first frequency band in a time period that overlaps communication for the second RAT on the second frequency band.

5. The apparatus of claim 3, wherein the scheduling includes a reduced number of layers for the first RAT on the first frequency band based on an amount of RF chains that are shared between the first RAT and the second RAT.

6. The apparatus of claim 3, wherein the scheduling avoids a retransmission for the first RAT on the first frequency band in a time period that overlaps communication for the second RAT on the second frequency band.

7. The apparatus of claim 3, wherein the scheduling avoids scheduling a sounding reference signal (SRS) for the first RAT on the first frequency band in a time period that overlaps a synchronization signal or reference signal for the second RAT on the second frequency band.

8. The apparatus of claim 7, wherein the reference signal includes one or more of a positioning reference signal (PRS) or a cell-specific reference signal (CRS).

9. The apparatus of claim 1, further comprising:
at least one antenna; and
a transceiver coupled to the at least one antenna and the at least one processor.

10. A method of wireless communication at a user equipment (UE), comprising:
sharing a radio frequency (RF) path between wireless communication for a first radio access technology (RAT) on a first frequency band and a second RAT on a second frequency band, wherein the RF path is based on a number of RF shared chains that are shared between the first RAT on the first frequency band and the second RAT on the second frequency band;
transmitting an indication, to a network of the first RAT or the second RAT, indicating the number of the RF shared for the shared RF path between the first RAT and the second RAT and a list of frequency band combinations associated with the shared RF path including the first frequency band and the second frequency band; and
receiving a configuration for dual connectivity based on the first RAT and the second RAT.

11. The method of claim 10, wherein the method further comprises:
receiving scheduling from a base station based on the shared RF path at the UE.

12. The method of claim 11, wherein the scheduling avoids resources for the first RAT on the first frequency band in a time period that overlaps communication for the second RAT on the second frequency band.

13. The method of claim 11, wherein the scheduling includes a reduced number of layers for the first RAT on the first frequency band based on an amount of RF chains that are shared between the first RAT and the second RAT.

14. The method of claim 11, wherein the scheduling avoids a retransmission for the first RAT on the first frequency band in a time period that overlaps communication for the second RAT on the second frequency band.

15. The method of claim 11, wherein the scheduling avoids scheduling a sounding reference signal (SRS) for the first RAT on the first frequency band in a time period that overlaps a synchronization signal or reference signal for the second RAT on the second frequency band.

16. The method of claim 15, wherein the reference signal includes one or more of a positioning reference signal (PRS) or a cell-specific reference signal (CRS).

17. An apparatus for wireless communication at a base station, comprising:
memory; and
at least one processor coupled to the memory and configured to:
receive an indication from a user equipment (UE) about a shared radio frequency (RF) path between a first radio access technology (RAT) and a second RAT, wherein the RF path is based on a number of RF shared chains that are shared between the first RAT on a first frequency band and the second RAT on a second frequency band, and wherein the indication indicates the number of the RF shared chains for the shared RF path between the first RAT and the second RAT and a list of frequency band combinations associated with the shared RF path including the first frequency band and the second frequency band;
configure the UE for dual connectivity based on the first RAT and the second RAT; and
schedule wireless communication with the UE based on the shared RF path at the UE.

18. The apparatus of claim 17, wherein scheduling the wireless communication with the UE based on the shared RF path at the UE includes avoiding scheduling resources for the first RAT on the first frequency band in a time period that overlaps communication for the second RAT on the second frequency band.

19. The apparatus of claim 17, wherein scheduling the wireless communication with the UE based on the shared RF path at the UE includes scheduling a reduced number of layers for the first RAT on the first frequency band based on an amount of RF chains that are shared between the first RAT and the second RAT.

20. The apparatus of claim 17, wherein scheduling the wireless communication with the UE based on the shared RF path at the UE includes avoiding scheduling a retransmission for the first RAT on the first frequency band in a time period that overlaps communication for the second RAT on the second frequency band.

21. The apparatus of claim 17, wherein scheduling the wireless communication with the UE based on the shared RF path at the UE includes avoiding scheduling a sounding reference signal (SRS) for the first RAT on the first frequency band in a time period that overlaps a synchronization signal or reference signal for the second RAT on the second frequency band.

22. The apparatus of claim 21, wherein the reference signal includes one or more of a positioning reference signal (PRS) or a cell-specific reference signal (CRS).

23. The apparatus of claim 17, wherein the indication is comprised in a UE capability message.

24. The apparatus of claim 17, further comprising:
at least one antenna; and
a transceiver coupled to the at least one antenna and the at least one processor.

25. A method of wireless communication at a base station, comprising:
receiving an indication from a user equipment (UE) about a shared radio frequency (RF) path between a first radio access technology (RAT) and a second RAT, wherein the RF path is based on a number of RF shared chains that are shared between the first RAT on a first frequency band and the second RAT on a second frequency band, and wherein the indication indicates the number of the RF shared chains for the shared RF path between the first RAT and the second RAT and a list of frequency band combinations associated with the shared RF path including the first frequency band and the second frequency band;
configuring the UE for dual connectivity based on the first RAT and the second RAT; and
scheduling wireless communication with the UE based on the shared RF path at the UE.

26. The method of claim 25, wherein scheduling the wireless communication with the UE based on the shared RF path at the UE includes avoiding scheduling resources for the first RAT on the first frequency band in a time period that overlaps communication for the second RAT on the second frequency band.

27. The method of claim 25, wherein scheduling the wireless communication with the UE based on the shared RF path at the UE includes scheduling a reduced number of layers for the first RAT on the first frequency band based on an amount of RF chains that are shared between the first RAT and the second RAT.

28. The method of claim 25, wherein scheduling the wireless communication with the UE based on the shared RF path at the UE includes avoiding scheduling a retransmission for the first RAT on the first frequency band in a time period that overlaps communication for the second RAT on the second frequency band.

29. The method of claim 25, wherein scheduling the wireless communication with the UE based on the shared RF path at the UE includes avoiding scheduling a sounding reference signal (SRS) for the first RAT on the first frequency band in a time period that overlaps a synchronization signal or reference signal for the second RAT on the second frequency band.

30. The method of claim 29, wherein the reference signal includes one or more of a positioning reference signal (PRS) or a cell-specific reference signal (CRS).

\* \* \* \* \*